United States Patent
Yu

(10) Patent No.: US 9,197,285 B2
(45) Date of Patent: Nov. 24, 2015

(54) METHODS AND APPARATUS FOR AMELIORATING SIGNAL RECEPTION

(71) Applicant: Deere & Company, Moline, IL (US)

(72) Inventor: Wei Yu, Torrance, CA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 13/721,864

(22) Filed: Dec. 20, 2012

(65) Prior Publication Data

US 2014/0177682 A1    Jun. 26, 2014

(51) Int. Cl.
*H04B 1/00*        (2006.01)
*H04B 1/7097*      (2011.01)
*G01S 19/21*       (2010.01)

(52) U.S. Cl.
CPC .............. *H04B 1/7097* (2013.01); *G01S 19/21* (2013.01)

(58) Field of Classification Search
CPC ...... H04B 1/7101; G01S 19/21; G01S 19/219
See application file for complete search history.

(56) References Cited

U.S. PATENT DOCUMENTS

| | | | | |
|---|---|---|---|---|
| 5,268,927 | A * | 12/1993 | Dimos et al. .................... | 375/147 |
| 5,596,600 | A * | 1/1997 | Dimos et al. .................... | 375/148 |
| 5,825,898 | A | 10/1998 | Marash | |
| 6,115,409 | A * | 9/2000 | Upadhyay et al. ............. | 375/144 |
| 6,141,371 | A * | 10/2000 | Holmes et al. ................. | 375/130 |
| 6,327,298 | B1 * | 12/2001 | Grobert ........................... | 375/148 |
| 6,603,803 | B1 | 8/2003 | Hatch | |
| 7,912,158 | B2 | 3/2011 | Cahn et al. | |
| 8,073,084 | B1 * | 12/2011 | Giallorenzi et al. ........... | 375/343 |
| 8,159,390 | B2 * | 4/2012 | Dixon et al. ................ | 342/357.59 |
| 2002/0196876 | A1 | 12/2002 | Takada | |
| 2003/0112905 | A1 * | 6/2003 | Heinzl et al. ................... | 375/350 |
| 2004/0165687 | A1 * | 8/2004 | Webster et al. ................ | 375/350 |
| 2004/0176909 | A1 * | 9/2004 | Desjardins ..................... | 701/213 |
| 2005/0047493 | A1 * | 3/2005 | Underbrink et al. ........... | 375/150 |
| 2005/0271123 | A1 | 12/2005 | Fulghum | |
| 2008/0279287 | A1 | 11/2008 | Asahina | |
| 2010/0098136 | A1 | 4/2010 | Abraham et al. | |

(Continued)

OTHER PUBLICATIONS

Laurence B. Milstein, "Interference Rejection Techniques in Spread Spectrum Communications," Jun. 1988, pp. 657-671, Proceedings of the IEEE, vol. 76, No. 6.

(Continued)

*Primary Examiner* — Leon-Viet Nguyen
(74) *Attorney, Agent, or Firm* — Hanley, Flight & Zimmerman, LLC

(57) ABSTRACT

Methods and apparatus are disclosed for ameliorating signal reception. An example method disclosed herein includes receiving a composite satellite signal comprising a desired signal component and an interference signal component, converting the received composite satellite signal to a digital received composite signal, receiving a first group of samples from the digital received composite signal, generating an interference estimate of the interference signal component based on the first group of samples, combining the interference estimate and a second sample belonging to a second group of samples to remove, partially or entirely, the interference signal component from the composite satellite signal, the first group of samples received prior to the sample belonging to the second group of samples, wherein the removal is generally independent of the code chip rate of the desired signal component and substantially retains the undistorted chip edge characteristics of the desired signal component.

21 Claims, 12 Drawing Sheets

(56) References Cited

U.S. PATENT DOCUMENTS

2012/0214524 A1 8/2012 Wajcer et al.
2012/0258679 A1 10/2012 Chang
2012/0306695 A1* 12/2012 Kim et al. ................ 342/357.59

OTHER PUBLICATIONS

International Searching Authority, "Search Report," issued in connection with PCT Patent Application No. PCT/US2013/074242, mailed on Apr. 18, 2014, 3 pages.

International Searching Authority, "Written Opinion," issued in connection with PCT Patent Application No. PCT/US2013/074242, mailed on Apr. 18, 2014, 9 pages.

Amoroso, Frank, "Adaptive A/D Converter to Suppress CW Interference in DSPN Spread-Spectrum Communications," IEEE Transactions on Communications, vol. Com.31, No. 10, Oct. 1993, pp. 1117-1123, 7 pages.

Widrow et al., "The Complex LMS Algorithm", Proceedings of the IEEE, Apr. 1975, pp. 719-720, 2 pages.

Widrow et al., "Fundamental Relations Between the LMS Algorithm and the DFT," IEEE Transactions on Circuits and Systems, vol. CAS 34, No. 7, Jul. 1987, pp. 814-820, 7 pages.

Patent Cooperation Treaty, "International Preliminary Report on Patentability," issued in connection with PCT Application No. PCT/US2013/074242, issued on Jun. 23, 2015, 5 pages.

* cited by examiner

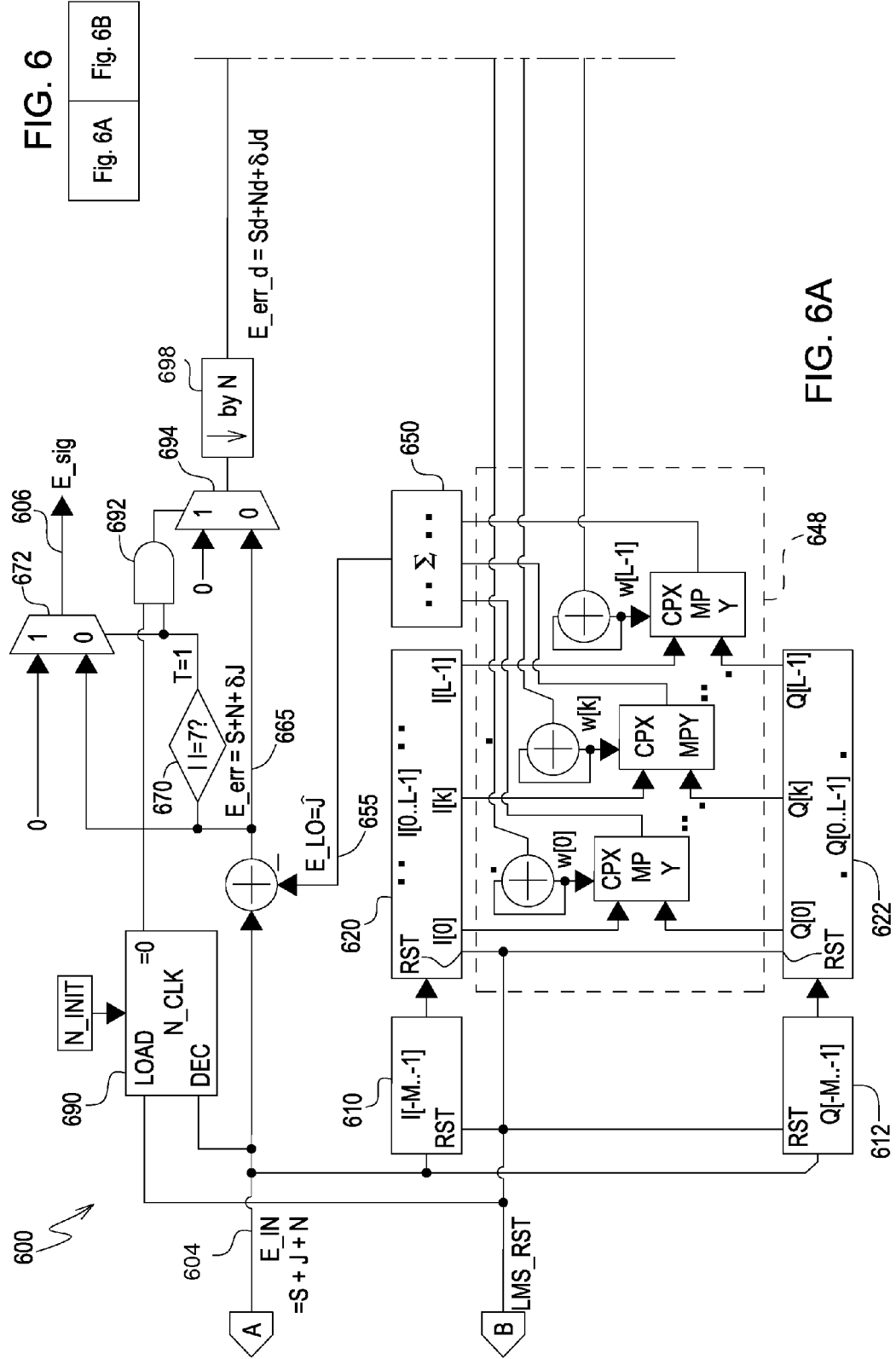

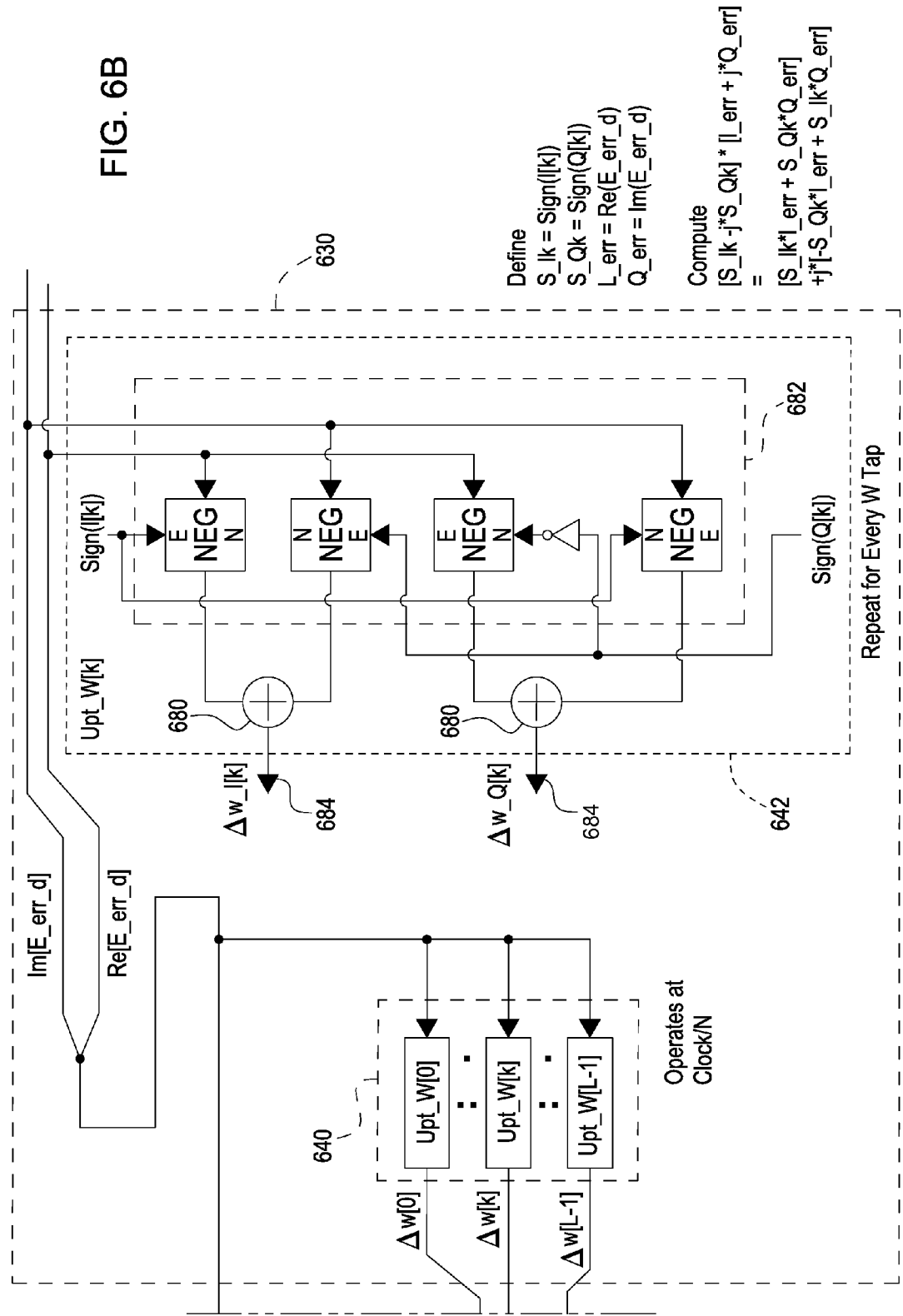

METHODS AND APPARATUS FOR AMELIORATING SIGNAL RECEPTION

FIELD OF THE INVENTION

This disclosure relates generally to communication signals, and, more particularly, methods and apparatus to remove unwanted components from communication signals.

BACKGROUND

Communication signals are often times accompanied by interference. The presence of interference degrades the accuracy of the communication between two devices. Accordingly, eliminating or removing interference, for example a jamming signal, from a communication signal enables a receiver to more accurately determine the contents of the communication signal.

SUMMARY

Example methods and apparatus disclosed herein ameliorate signal reception. An example method for ameliorating signal reception of a satellite navigation receiver disclosed herein includes receiving a composite satellite signal comprising a desired signal component and an interference signal component; converting the received composite satellite signal to a digital received composite signal; receiving a first group of samples from the digital received composite signal; generating an interference estimate of the interference signal component based on the first group of samples; combining the interference estimate and a second sample belonging to a second group of samples to remove, partially or entirely, the interference signal component from the composite satellite signal, the first group of samples received prior to the sample belonging to the second group of samples, wherein the removal is generally independent of a code chip rate of the desired signal component and substantially retains undistorted chip edge characteristics of the desired signal component.

An example apparatus disclosed herein includes a receiver to receive a composite satellite signal comprising a desired signal component and an interference signal component, a converter to convert the received composite satellite signal to a digital received composite signal; an interference rejecter to receive a first group of samples from the digital received composite signal, generate an interference estimate of the interference signal component based on the first group of samples, and combine the interference estimate and a second sample belonging to a second group of samples to remove, partially or entirely, the interference signal component from the composite satellite signal, the first group of samples received prior to the sample belonging to the second group of samples, wherein the removal is generally independent of a code chip rate of the desired signal component and substantially retains undistorted chip edge characteristics of the desired signal component.

An example machine readable storage medium is disclosed herein having machine readable instructions that when executed cause a machine to receive a composite satellite signal comprising a desired signal component and an interference signal component, convert the received composite satellite signal to a digital received composite signal, receive a first group of samples from the digital received composite signal, generate an interference estimate of the interference signal component based on the first group of samples, and combine the interference estimate and a second sample belonging to a second group of samples to remove, partially or entirely, the interference signal component from the composite satellite signal, the first group of samples received prior to the sample belonging to the second group of samples, wherein the removal is generally independent of a code chip rate of the desired signal component and substantially retains undistorted chip edge characteristics of the desired signal component.

BRIEF DESCRIPTION OF THE DRAWINGS

FIG. 6 is a diagram depicting the construction of FIGS. 6A-6B of an implementation of the first example interference rejection system of FIG. 3 that may be used in conjunction with the example systems of FIG. 5.

DETAILED DESCRIPTION

Methods and apparatus for ameliorating signal reception are disclosed herein. Example methods disclosed herein include receiving a composite satellite signal comprising a desired signal component and converting the received composite satellite signal to a digital received composite signal. Example methods include a first group of samples is received from the digital received composite signal and an interference estimate of the interference signal component is generated based on the first group of samples. Example methods further include combining the interference estimate and a second sample belonging to a second group of samples to remove, partially or entirely, the interference signal component from the composite satellite signal, the first group of samples received prior to the sample belonging to the second group of samples, wherein the removal is generally independent of a code chip rate of the desired signal component and substantially retains undistorted chip edge characteristics of the desired signal component.

In some examples, generating the interference signal estimate comprises weighted combining of the first group of samples. Example methods further include updating weights used in the weighted combining according to a least mean square process. In some examples, the least mean square process updates the weights by integrating a correlation between the first group of samples and the combined interference signal estimate and the sample belonging to the second group of samples.

In some examples, the first group of samples relates to a first communication chip and the sample belonging to the second group of samples relates to a second communication chip different from the first communication chip. In some examples, the second communication chip is at least one communication chip apart from the first communication chip. In some examples, the first group of samples and the second group of samples are associated with a spread-spectrum navigation system.

Figure 1:
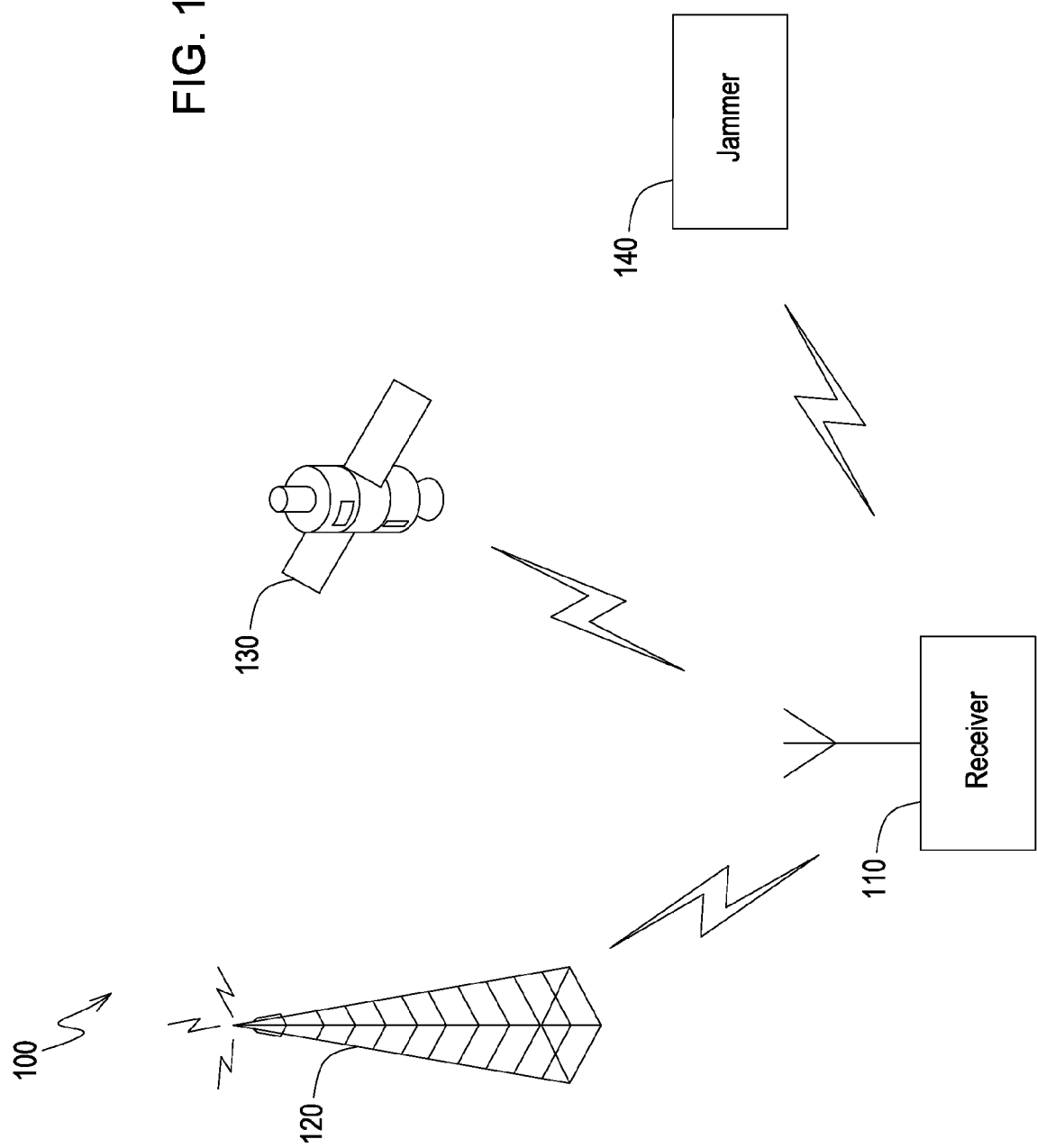
FIG. 1 illustrates an example receiver in an example environment of use.

FIG. 1 is an example environment of use 100 for an example receiver 110 constructed in accordance with the teachings of this disclosure to ameliorate signal reception. In the illustrated example of FIG. 1, the example receiver 110 is shown in the presence of an example base station 120, an example satellite 130, and an example jammer 140. The receiver 110 receives signals from the base stations 120 and/or the satellite 130, as well as signals from the jammer 140. As described below, the receiver 110 processes received signals in a manner that allows the undesired effects of the signal from the jammer 140 to be ameliorated.

In the illustrated example of FIG. 1, the receiver 110 is a global navigation satellite system (GNSS) receiver. The receiver 110 is capable of communicating with the base station 120 and the satellite 130. In some examples, the receiver 110 may be one or more of a mobile phone, personal digital assistant (PDA), tablet computer, or other similar mobile device.

The base station 120 of FIG. 1 may wirelessly communicate with the receiver 110 to enable the receiver 110 to connect to a network (e.g., the Internet, a cellular network, a local area network, etc.). In some examples, the base station 120 provides signals that assist the receiver 110 in navigation functions. Additionally, the receiver 110 may communicate with the base station 120 for the purposes of updating software or other maintenance procedures. While only one base station 120 is shown in FIG. 1, other base stations may be present and may be advantageously utilized by the receiver 110 during navigation or other operations.

In the illustrated example of FIG. 1, the satellite 130 is a satellite associated with one or more spread spectrum global navigation satellite system (GNSS). For example, the satellite 130 may be a part of a global positioning system (GPS), Globalnaya Navigatsionnaya Sputnikovaya Sistema (GLONASS), Compass, Galileo, etc. The satellite 130 transmits signals that are received and processed by receiver 110 to facilitate the receiver 110 (or auxiliary systems in communication with the receiver 110) to determine the geographic location of the receiver 110. In one example, the satellite 130 provides geographic location data, such as, for example, time signals, communication data, etc. to the receiver 110 in the form of spread-spectrum encoded signals. In the illustrated example, the receiver 110 may accommodate signals from one or more than one GNSS, and, thus, may receive signals at a variety of spread-spectrum code chip rates.

At a transmit side of a spread-spectrum communication system, symbols, each of which may represent a number of bits of information, having a symbol rate are combined with a pseudorandom (PN) chip sequence having a chip rate (also referred to as a chipping rate) that is higher than the symbol rate. The combination of the symbols and the chip sequence spreads the symbols throughout a range of communication frequency spectrum. The spread-spectrum signal is then modulated and upconverted to a radio frequency signal and transmitted. At a receive side, the received signal is downconverted and the spread-spectrum signal is sampled at a sampling rate and combined with a chip sequence to obtain the symbols that were originally combined with the chip sequence at the transmitter. The chip sequence is a PN sequence, therefore, adjacent chips are not correlated (i.e., adjacent chips are de-correlated) and information (e.g., symbols) combined with adjacent chip is de-correlated.

The jammer 140 may be any electronic device (e.g., other communication devices, microwaves, transformers, power lines, etc.) capable of interfering with communication between the receiver 110 and the base station 120 or satellite 130. The jammer 140 may be a narrowband jammer that interferes with communication signals from the satellite 130 to the receiver 110, whether intentionally or unintentionally, by outputting jamming signals at or near the same frequency that the communication signals are transmitted and/or received. Even though one jammer is pictured in FIG. 1, multiple jammers may be present.

In the illustrated example of FIG. 1, the receiver 110 receives communication signals from the base station 120 and/or the satellite 130 and jamming signals from the jammer 140. In the illustrated example, signals from the base stations 120 and/or the satellite 130 are desirable, whereas signals from the jammer 140 are undesirable and degrade the ability of the receiver 110 to receive signals from the base stations 120 and/or the satellite 130. Accordingly, to enhance performance of the receiver 110 when receiving intended communication signal from the base station 120 and/or the satellite 130, the jamming signal from jammer 140 may be removed by the receiver 110, as described below. That is, to enhance performance of the receiver 110, the jamming signal is ameliorated by receiver 110.

Figure 2:
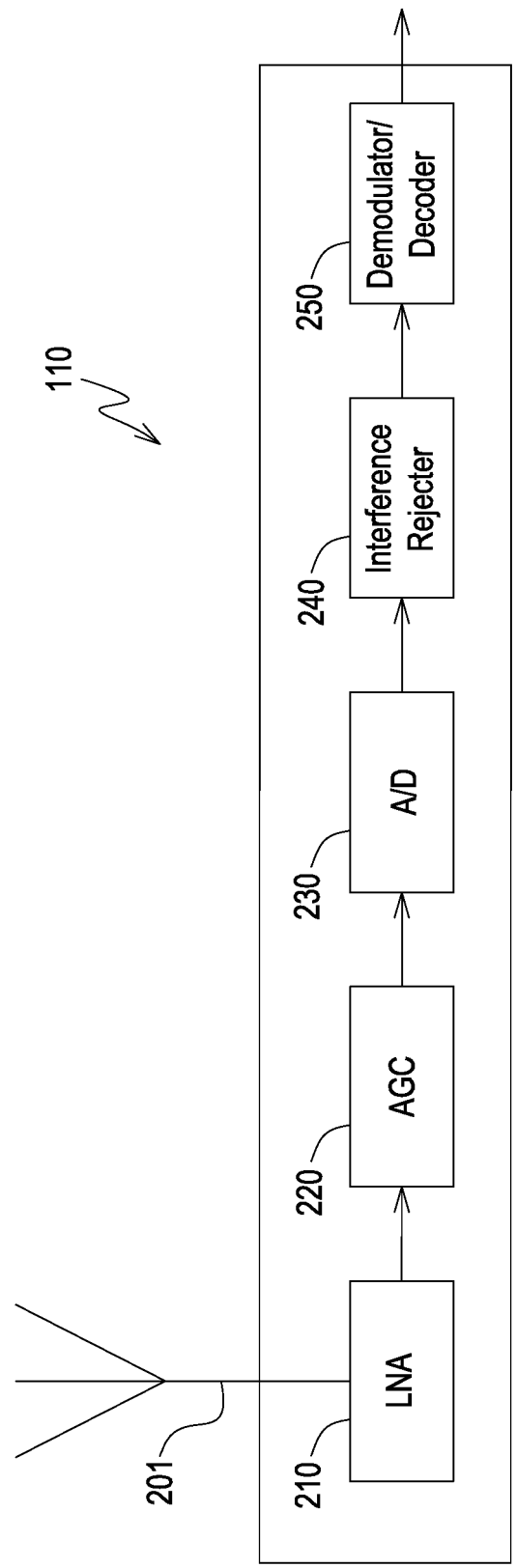
FIG. 2 is a block diagram of an example receiver that may be used to implement a portion of the receiver of FIG. 1.

FIG. 2 is a block diagram of a portion of an example receiver, such as the receiver 110 of FIG. 1, for ameliorating signal reception. In the example of FIG. 2, the receiver includes an antenna 201 coupled to a low noise amplifier (LNA) 210, an automatic gain control (AGC) 220, an analog-to-digital converter (A/D) 230, an interference rejecter 240, and a demodulator/decoder 250. Although shown as being distinct in the representation of FIG. 2, the components of FIG. 2 may be combined into one or more integrated circuits. Furthermore, some of the components shown in the example of FIG. 2 may be omitted or changed.

The antenna 201 receives signals from, for example, the base station 120, satellite 130, and/or jammer 140 of FIG. 1. In one example, the antenna 201 couples a composite signal to the LNA 210. The composite signal may include spread spectrum navigation system signals from the satellite 130 (e.g., a desired signal component), as well as a signal from the jammer 140 (e.g., an undesired interference signal component). In one example, to perform geographical location or other navigation functions, the receiver 110 identifies and processes the desired signal component. The LNA 210 amplifies the composite signals from the antenna 201, which may include interference signal components, and provides them to the AGC 220. For example, one or more of the LNA 210 and the AGC 220 may include functionality to downconvert the signal from the antenna 201 to an intermediate frequency and/or a baseband frequency. Alternatively, a separate downconversion block may be provided.

The AGC 220 of FIG. 2 receives the amplified composite satellite signals from the LNA 210 and adjusts a gain applied to the composite signals so that signal levels match the sensitivity range of the A/D 230. The AGC 220 sets the gain of the receiver 110 so that an amplitude of the received signal substantially matches the maximum allowable range of the amplitude of the A/D 230 without clipping. In some examples, the AGC 220 automatically detects sudden changes in the signal strength of the signals using a maximum and minimum threshold. These sudden changes may occur due to starting and/or stopping of a jamming signal from the jammer 140 because the jamming signal strength may otherwise saturate the A/D 230 range, causing clipping. The AGC 220 adjusts the gain of the receiver 110 to compensate for the change to enable the interference rejecter 240 to identify and remove the jamming signal, or interference signal, from the composite signal. The output of the AGC 220 is provided to the A/D 230.

In the illustrated example of FIG. 2, the A/D 230 of FIG. 2 converts the composite satellite signal received from the AGC 220 to a digital composite signal. The digital composite signal may include one or more samples or groups of samples. In some examples, the sampling rate of the digital composite signal is 4, 16, or 24 times an oscillator frequency of the receiver 110, which may be 10.23 megahertz (MHz). In one example, the chip rate, which is the rate at which chips are combined with symbols to make a spread-spectrum signal, is 1.023 MHz. The A/D 230 forwards the digital signal to the interference rejecter 240. An example implementation of the AGC 220 and the A/D 230 of FIG. 2 is further described with reference to FIG. 5.

In the illustrated example of FIG. 2, the interference rejecter 240 removes, partially or entirely, the interference signal component, such as jamming signals, from the jammer 140, received at or near the same frequency as the satellite composite signal. The interference rejecter 240 makes an interference estimate, for example the amplitude and phase of the jamming signal, based on a first group of received samples. The interference rejecter 240 of FIG. 2 uses the interference estimate to remove the interference from the composite satellite signal. The interference rejecter 240 then forwards the composite satellite signal that is substantially free from interference (i.e., the desired composite satellite component) to the demodulator/decoder 250. The demodulator/decoder 250 demodulates/decodes the composite satellite signal, now substantially consisting of the desired composite satellite component.

Figure 7:
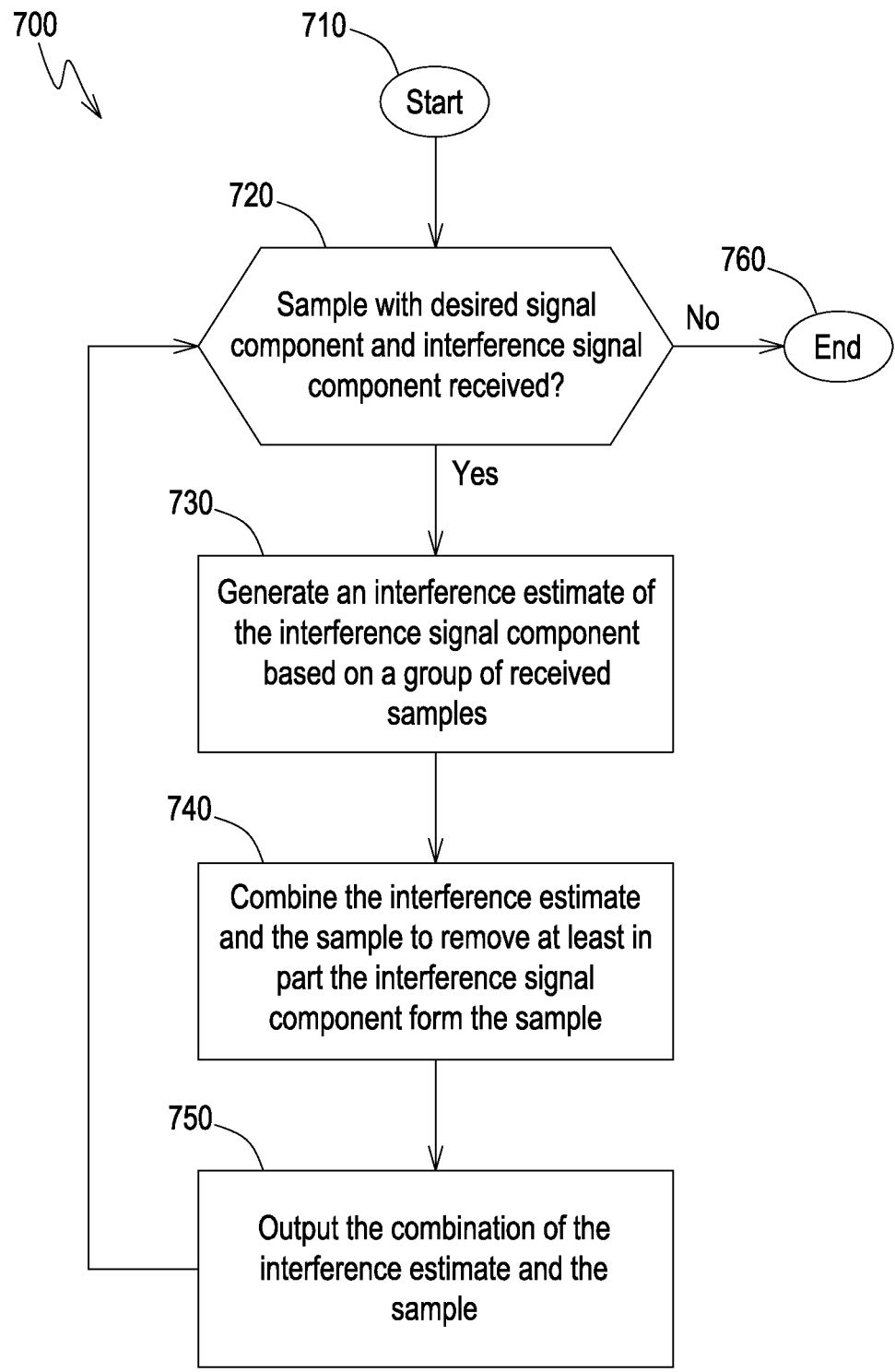
FIG. 7 is a flow chart representative of an example process that may be executed using machine readable instructions to implement the example interference rejecter of FIG. 2.

The diagrams of FIG. 2-FIG. 6 and the flowchart of FIG. 7 are representative of systems and processes that may be implemented using example hardware and/or machine readable instructions stored on a tangible medium for implementing one or more of the LNA 210, the AGC 220, the A/D 230, the interference rejecter 240, and the demodulator/decoder 250 and/or, more generally, the receiver 110. For example, the systems and processes may be carried out using machine readable instructions, such as a program for execution by a processor such as the processor 812 shown in the example processor platform 800 discussed below in connection with FIG. 8. Such a program may be embodied in software stored on a tangible computer readable storage medium such as a memory, a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or hardware. Further, although examples are described with reference to FIGS. 3-7, many other techniques or methods of implementing the receiver 110 and the processes and systems therein may be used. For example, the order of execution of the blocks may be changed, and/or some of the blocks described may be changed, eliminated, or combined.

As mentioned above, the example systems and methods described herein may be implemented using coded instructions (e.g., computer readable instructions) stored on a tangible computer readable storage medium such as a hard disk, a flash memory, a read-only memory (ROM), cache, random-access memory (RAM) and/or any other storage medium in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disk, exclusive of propagating signals.

Additionally or alternatively, the example systems and processes described herein may be implemented using coded instructions (e.g., computer readable instructions) stored on a non-transitory computer readable storage medium such as a hard disk, a flash memory, a read-only memory, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage disk or storage device and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 3:
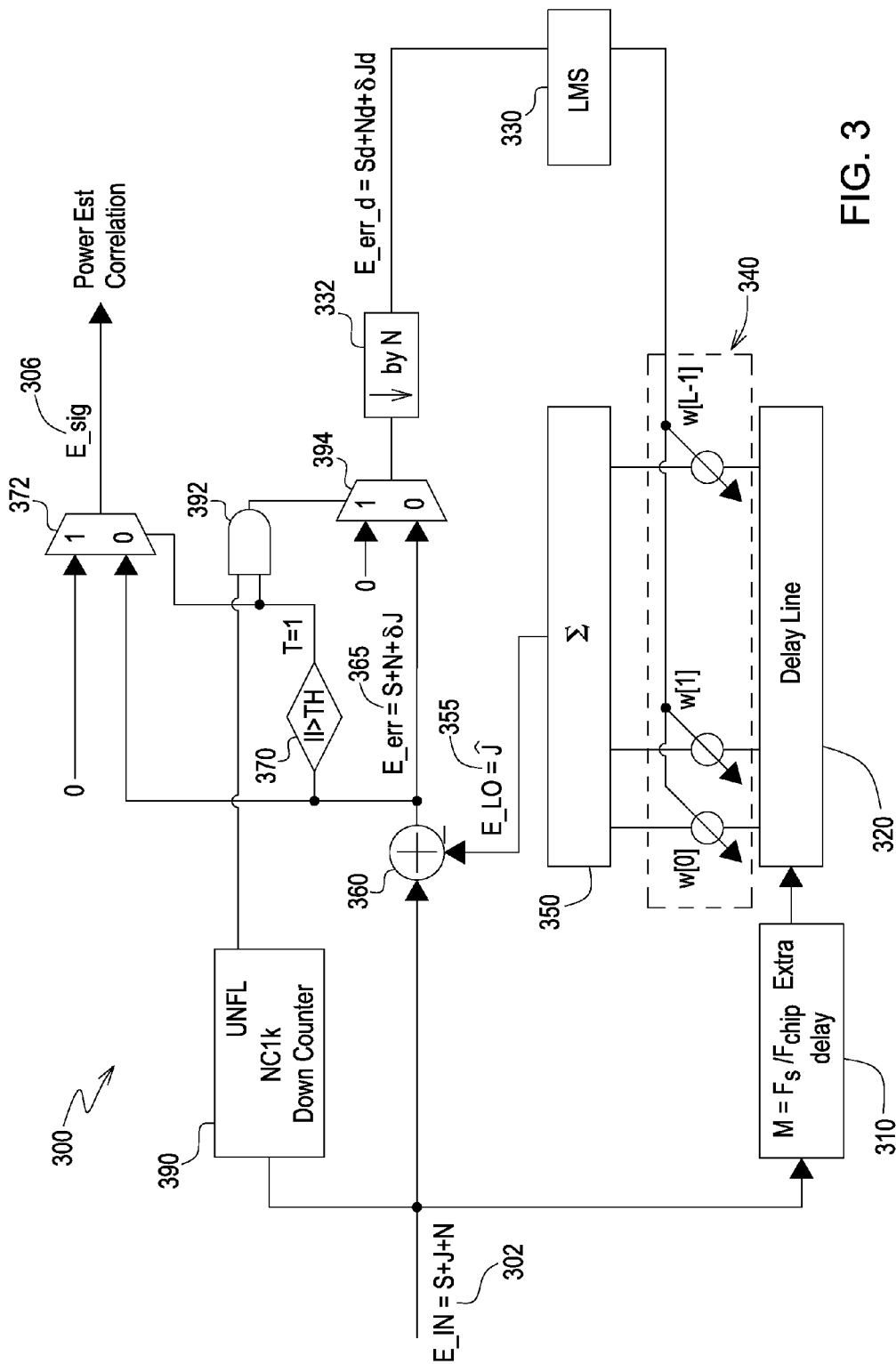
FIG. 3 is a diagram of a first example interference rejection system that may be implemented by the example receiver of FIGS. 1 and/or 2.

The diagram of FIG. 3 is representative of a system 300 that may be used to implement the interference rejecter 240 of FIG. 2. As shown, the system 300 receives a sample 302 (E_IN) of a signal including signal (S), jammer or interference (J), and noise (N) components. The system 300 produces a jammer estimate (Ĵ), removes some or all of the interference component J, and outputs a satellite signal component 306 (E_sig).

In operation of the system 300 of FIG. 3, the received sample 302 progresses through two delay lines 310, 320. The sample 302 is buffered in the first delay line 310 for a threshold number of samples, i.e., the sample 302 must wait for the threshold number of samples to be processed before being moved to the second delay line 320. The first delay line 310 ensures that the samples in the second delay line 320 are from a different chip than the sample 302. In some examples, the threshold number of samples is denoted as M, where $M=F_S/F_{CHIP}$, $F_S$ is equal to the sampling frequency and $F_{CHIP}$ is equal to the chipping rate or time multiplexing chipping rate, e.g., 1.023 MHz.

The first delay line 310 enables the system 300 to retain correlation for an interference signal, for example a jamming signal, as described herein, because the jammer spans multiple chips and will thus be correlated between chips, even with a delay between samples that makes the samples part of different chips. However, the number of samples M in the delay is larger than a chip, which de-correlates the desired signal component because portions of desired signal components that are combined with different chips are not correlated. Thus, owing to the first delay line 310, the only components between adjacent chips that correlate are jammers. Decorrelation is established using the lowest chipping rate transmitting from the satellite 130 and/or the base station 120.

After waiting in the first delay line 310, the sample 302 moves to the second delay line 320. The second delay line 320, which may be implemented using a finite impulse response (FIR) delay line, stores a number of samples L. A least mean square (LMS) block 330 analyzes previously received and/or outputted signal(s) to determine L updating weights 340 to be added to the corresponding L samples of the second delay line 320. The samples of the second delay line (including the example sample 302) are combined with the updating weights 340 (e.g., w[0], w[1] . . . w[L−1]) before moving to the summer 350. The summer 350 adds the weighted samples from the second line delay 320 and outputs a sample 355(E_LO). The sample 355 (E_LO) is an interference estimate ($\bar{J}$), described herein, because the amplitude of the signal component S and noise component N are very small compared to the J component of the samples in the second delay line 320 due to the de-correlation caused by the first delay line 310.

In order to identify and remove the interference component of the input sample 302, the input sample 302 is combined at block 360 with an example interference estimate (e.g., the interference estimate $\bar{J}$) to yield a sample 365 (E_err) based on previously received samples stored in the second line delay 320 and weights calculated by the LMS 330. The combined sample 365 can be defined by E_err=S+N+δJ, where δJ is equal to J−$\bar{J}$. In the illustrated example, the sample 365 (E_err) is used for demodulation processing and a discontinuity of an interference signal (e.g., a jammer waveform from the jammer 140) leads to an inaccurate estimation of J of the input sample 302, thus causing an outlier in the sample 365 (E_err) and hurting both the demodulation processing gain and stability of the LMS 330. In such examples, if the combined sample 365 exceeds a pre-defined threshold 370, the output signal 306 (E_sig) and combined sample 365 (E_err) are zeroed to reduce the negative impact.

In some examples, the LMS 330 processes samples at the sampling rate of the interference rejecter 240, however, a decimation block 332 may be used to reduce the processing demand.

In the illustrated example, the removal of the interference component J from input sample 302 is generally independent of the code chip rate of the desired signal component for at least the reason that the received samples are not integrated over a chip time. In the illustrated example, the output signal 306 (E_sig) substantially retains the undistorted chip edge characteristics of the desired signal component. The substantially undistorted chip edge characteristics indicate that the output signal 306 (E_sig) is substantially the same as when the signal was transmitted (e.g., from a satellite transmitter) and is essentially received in the absence of the interference signal component. The substantially undistorted chip edge characteristics allow the receiver 110 to use advanced multipath mitigation techniques (e.g., Hatch windows, double delta code tracking, etc.).

As another example with respect to FIG. 3, assume that the sample 302 is received at a time (t) and the sample 302 is equal to $y_t$ and defined by the equation: $y_t=s_t+J_t+n_t$, where $y_t$ is the input sample at time t, $s_t$ is the signal component in complex form, $J_t$ represents the jammer component in complex form, and $n_t$ is the additive noise in complex form. The input samples $y_t$ are delayed by M samples in the first delay line 310 before they are input into the second delay line 320, yielding sample $x_t$ defined by the equation: $x_t=y_{t-m}$. Accordingly, sample $x_t$ is buffering in the first delay line 310 when sample $y_t$ is received.

In the illustrated example, the sample $x_t$ is updated with weights 340 and combined by the summer 350 to yield sample 355 (E_LO) which is equal to an interference estimate $\bar{J}_t$ at time (t) (due to the greater amplitude of the an interference signal, $s_t$ and $n_t$ are very small, yielding only $\bar{J}_t$). Interference estimate $\bar{J}_t$ is added to $y_t$ at block 360. In some examples, $J_t-\bar{J}_t=0$, thus removing the interference $J_t$ from sample $y_t$ to yield $y_t=s_t+n_t$. If J does not equal $\bar{J}_t$, then $y_t=s_t+n_t+\delta J_t$, where $\delta J_t$ is used by the LMS 330 to determine the weights for the next received sample $y_{t+1}$. The LMS 330 determines the weights by integrating a correlation between a first group of samples (e.g. for time (t) above, sample $x_{t-1}$, sample $x_{t-2}$ etc.) and a combined interference signal estimate $\bar{J}_t$ and received signal (e.g., sample $y_t$).

In the illustrated example of FIG. 3, a counter 390 sets the delay to enable zeroing the sample 365 (E_err) for LMS 330 update. In some examples, over a pull in period, the weights 340 combined with the second delay line 320 may not generate an entirely accurate estimate of J of the input signal 302. In such examples, the zeroing of the combined signal 365 (E_err) is disabled for a pre-defined pull-in period. In some examples, the pull-in period of the interference rejecter 240 is shorter than a modulation period of the jammer 140.

Figure 4:
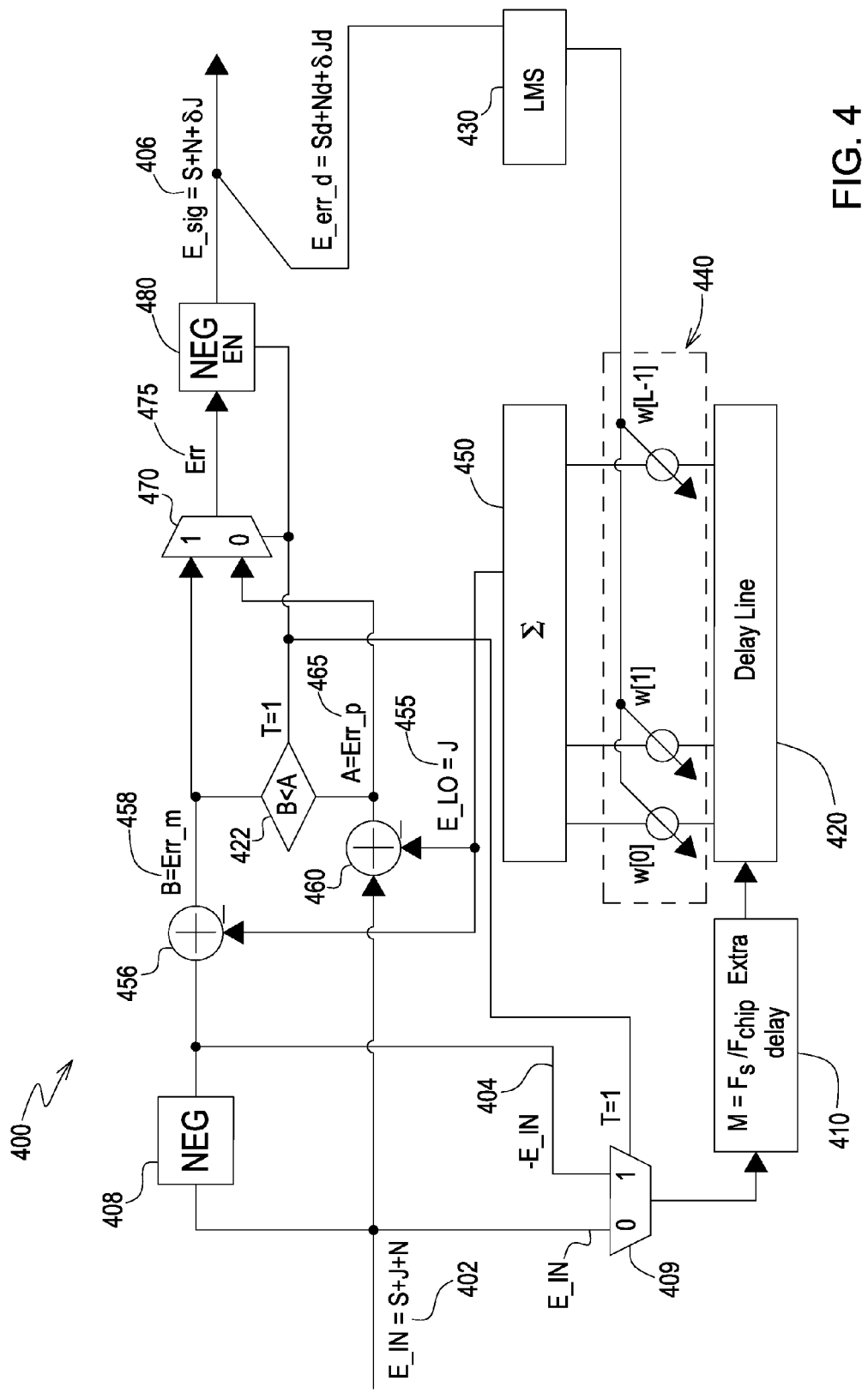
FIG. 4 is a diagram of a second example interference rejection system that may be implemented by the example receiver of FIGS. 1 and/or 2.
Figure 5A:
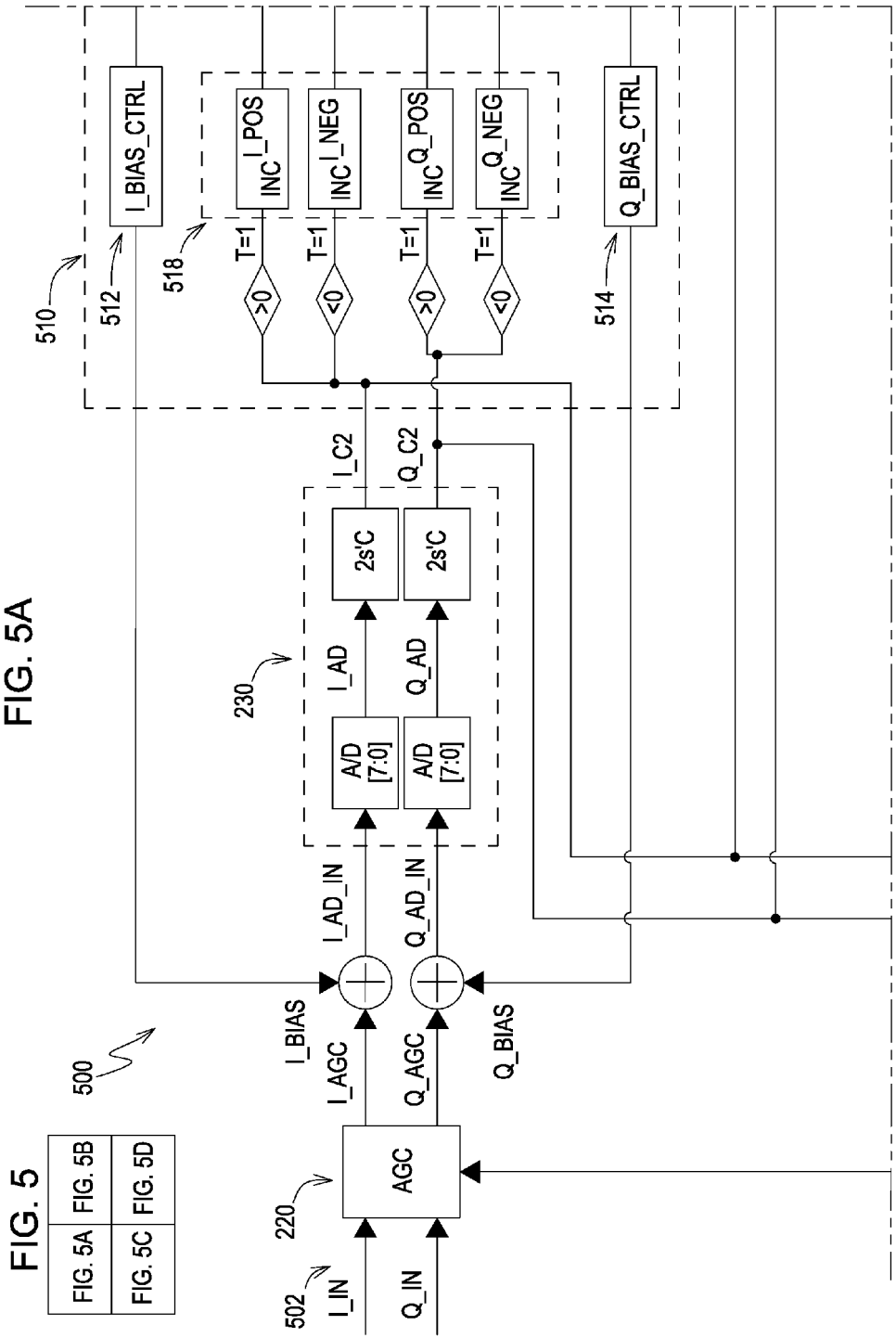
FIG. 5 is a diagram depicting the construction of FIGS. 5A-5D of an example automatic gain control system, an example analog-to-digital conversion system, and monitoring and detection systems that may be implemented by the example receiver of FIGS. 1 and/or 2.
Figure 5B:
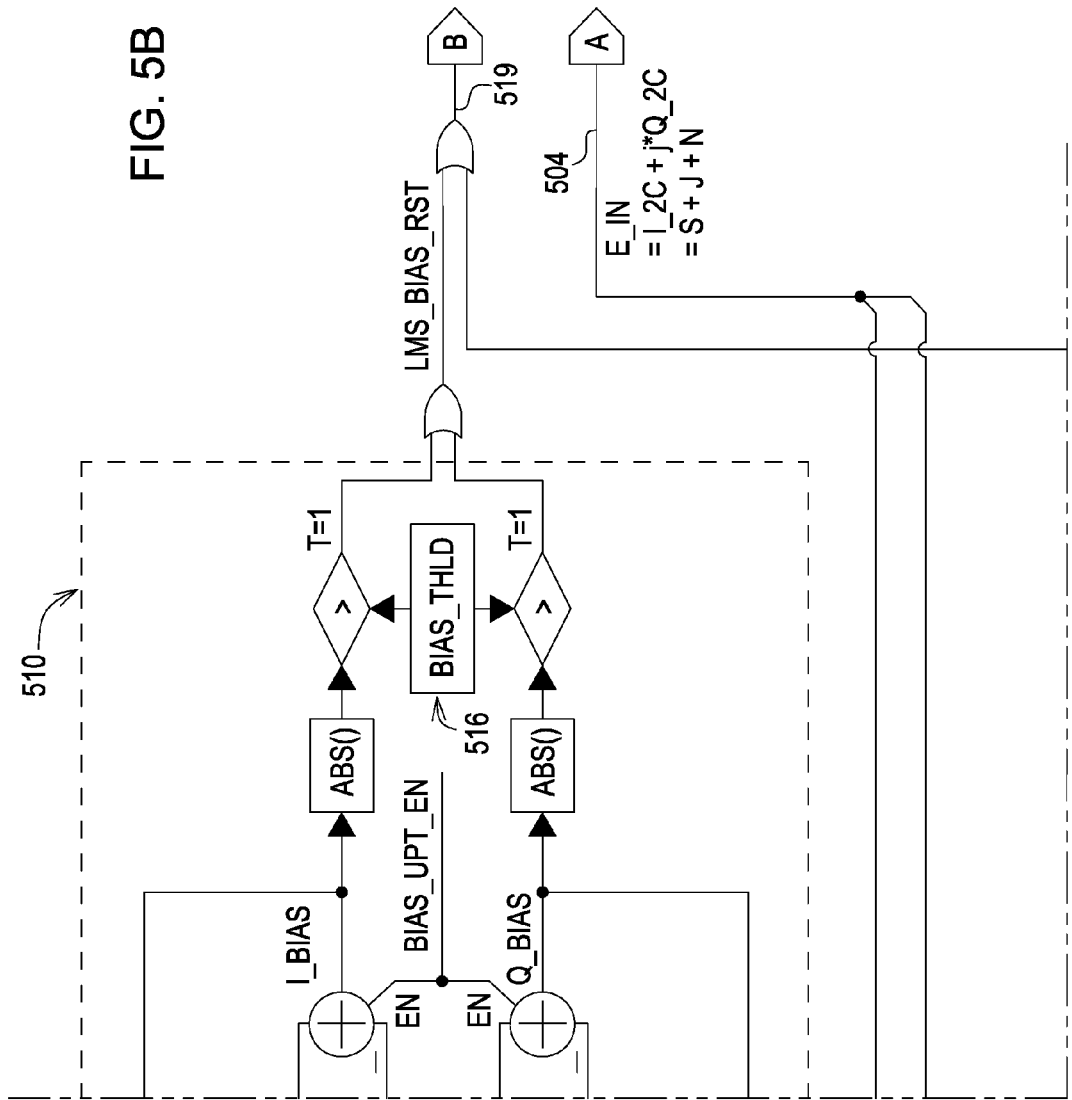
Figure 5C:
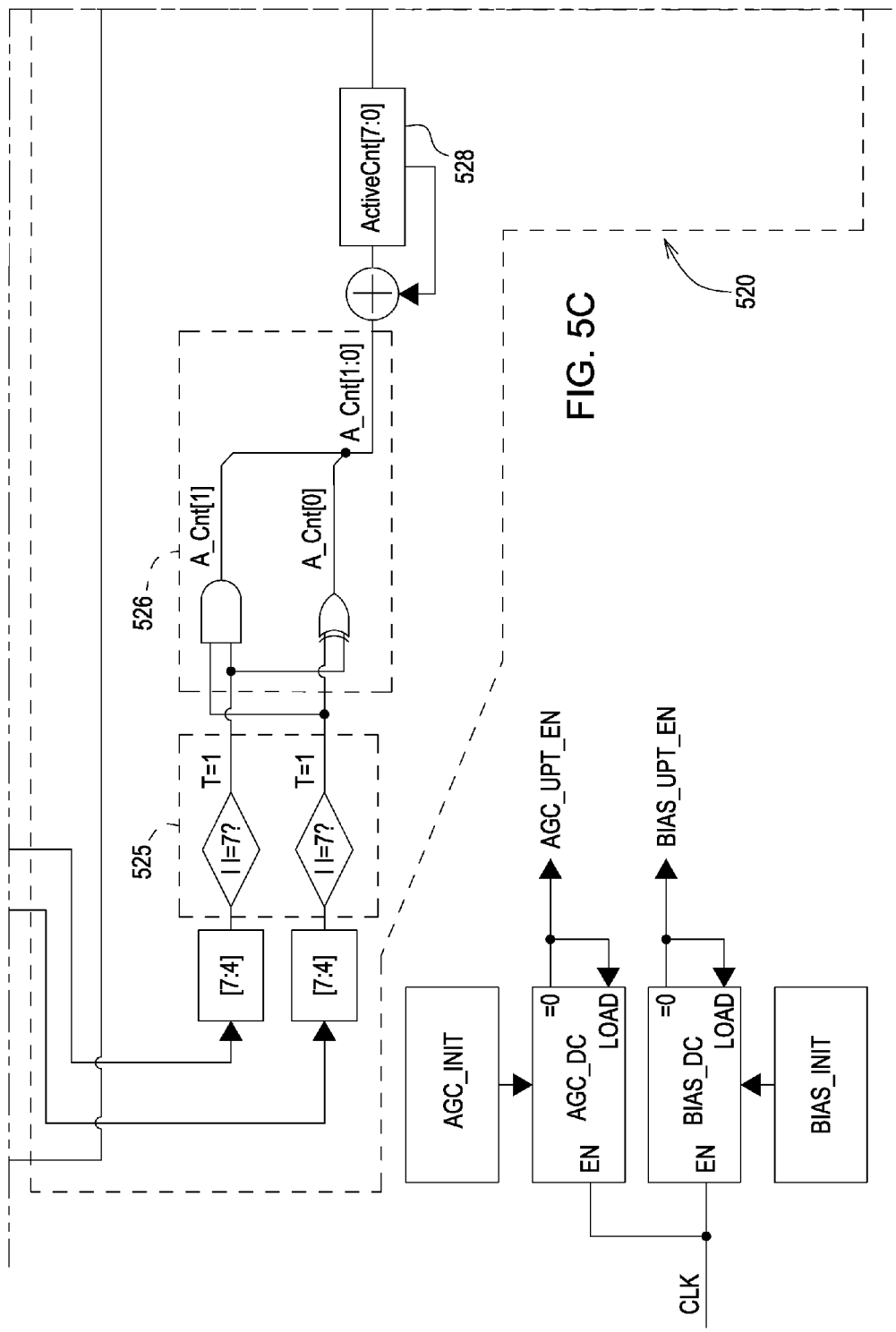
Figure 5D:
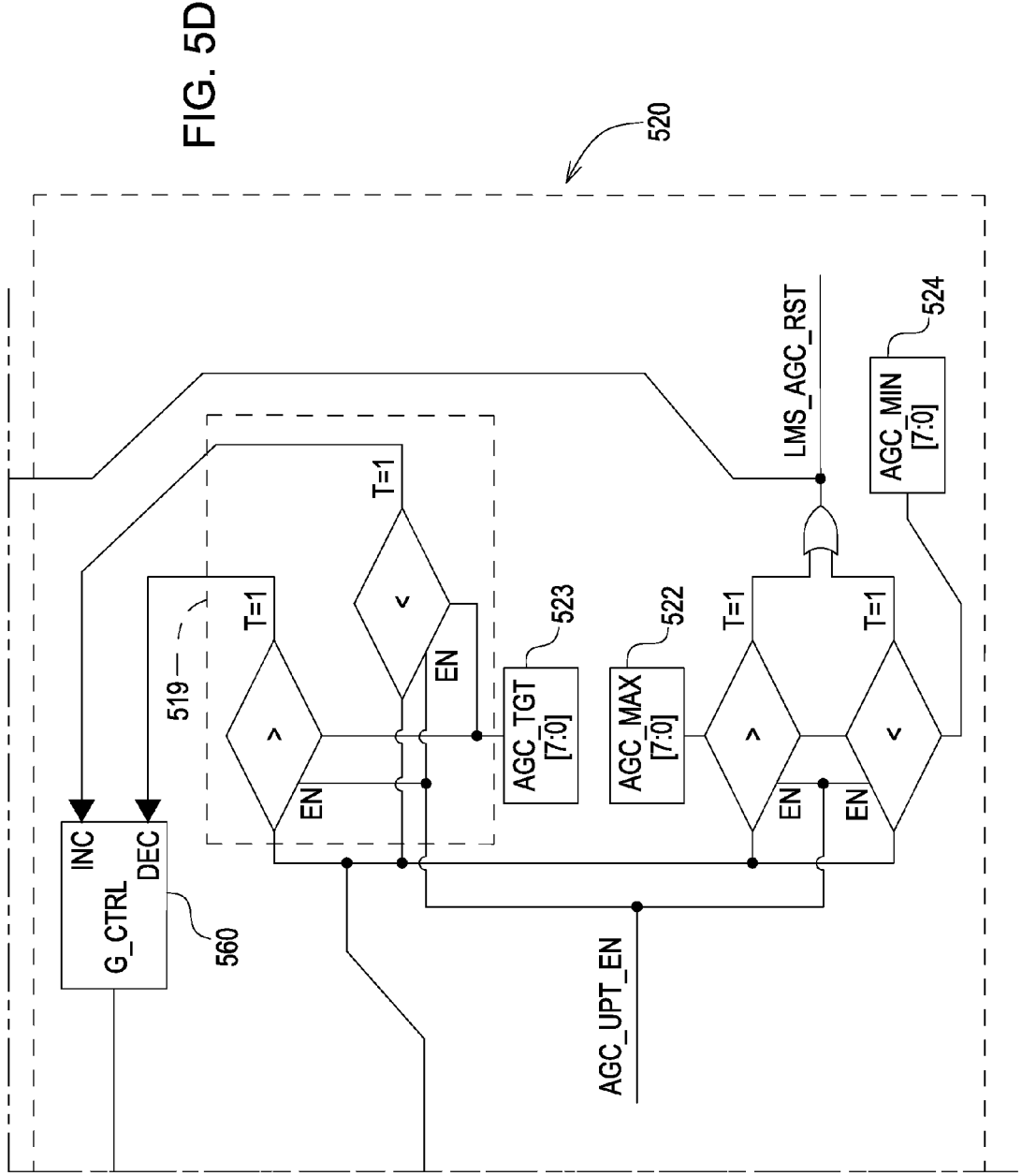

The diagram of FIG. 4 is representative of a second system 400 that may be implemented by the interference rejecter 240 of FIG. 2. In the illustrated example, the system 400 receives a sample 402 (E_IN) of a satellite signal and removes an interference component J (e.g., a jamming signal from the jammer 140) having binary phase-shift keying (BPSK) modulation therefrom. The received sample 402 is represented by the equation: E_IN=S+J+N, where S is equal to the desired satellite signal component, J is equal to interference (e.g., a jamming signal) and N is equal to noise. The sample 402 (E_IN) or its negative 404 (−E_IN) (created from the sample 402 (E_IN) by negation block 408) is used in generating an output signal 406.

The example system 400 illustrated in FIG. 4 uses maximum-likelihood (ML) criteria to decide whether the input sample 402 (E_IN) or its negative sample 404 (−E_IN) is to be fed into the first delay line 410 for modulation removal of the interference component J or −J, respectively. In the illustrated example, the waveform in the delay lines 410, 420 forms a modulation removed sample of the sample 402 (E_IN) and the ML criteria is used to generate the output signal 406 (E_Sig) based on whether the positive sample 402 (E_IN) or its negative 404 (−E_IN) closer to a sample 455 (E_LO) processed from delay lines 410, 420, as described below.

In the system 400 of FIG. 4, the positive sample 402 (E_IN) or the negative sample 404 is selected at selector 409 to enter the delay lines 410, 420 based on an ML derived output from the comparator 422. The comparator 422, as described below, estimates the polarity of the input sample 402 (E_IN) based on whether the positive sample 402 (E_IN) or the negative sample 404 (−E_IN) is closer to a sample (E_LO) 455.

The example process 400 of FIG. 4 utilizes delay lines 410, 420, an LMS 430 to update weights 440, and a summer 450 in a similar fashion to the delay lines 310, 320, the LMS 330, the weights 340, and the summer 350 as described with respect to FIG. 3. In the illustrated example, the comparator 422 determines whether the sample 402 (E_IN) or its negative 404 (−E_IN) better represents the sample 455 (E_LO). In the illustrated example, the receiver 110 compares the absolute value of a sample 458 (Err_m) (the difference between negative sample 404 (−E_IN) and the sample 455 (E_LO)) and a sample 465 (Err_p) (the difference between positive sample 402 (E_IN) and the sample 455 (E_LO)) using the summers 456, 460, respectively. Whichever one of the samples 458, 465 is closer in value to the sample 455 (E_LO) determines the polarity to represent the sample 455 (E_LO). The example result drives the first selector 409 to remove the BPSK modulation of the sample 402, forming a continuous waveform at delay lines 410, 420; the result also drives the second selector 470 to yield the sample 475 (Err). If A sample 475 (Err) is generated from the sample Err_m 458, a negative signal component (S) occurs, thus enabling a negation selector 480 to ensure that the positive signal component (S) in sample 406 is retained. Otherwise the sample Err 475 results from the sample Err_p 465, thus disabling the negation selector 480 to yield a positive signal component (S) in the output sample 406.

In the system of FIG. 4, the LMS 430 receives sample output 406 (E_Sig) from the negation selector 480. This enables the LMS 430 to use δJ to adjust the weights 440 to generate an interference estimate J̃, the estimate of modulation removed interference component J. The system 400 of FIG. 4 provides application of the interference rejecter 240 to BPSK interference from an example jammer (e.g., the jammer 140) by comparing whether the positive signal component J or the negative signal component −J is closer to the interference estimate J̃.

The diagram of FIG. 5 presents a diagram depicting the construction of FIGS. 5A-5D. FIGS. 5A-5D depict portions of a system 500 constructed in accordance with the teachings of this disclosure. Accordingly, when referring to FIG. 5 herein, the disclosure refers to the corresponding FIGS. 5A-5D.

The diagram of FIG. 5 is representative of a system 500 addressing in-phase and quadrature components, which may be implemented in the example receiver 110 of FIG. 2. The system 500 of FIG. 5 is an example system to adjust the gain of AGC 220, to maintain a symmetric waveform before sampling, and to generate a digital sample 504 (E_IN) that is output at reference point A, to be processed by the interference rejecter 240 of FIG. 2 implemented by one or more of the systems 300, 600 of FIGS. 3, and/or 6. The system 500 of FIG. 5 includes an AGC 220, an A/D 230, a bias control system 510, a gain control system 520, as described herein. The AGC 220 and the A/D 230 may be implemented by the AGC 220 and the A/D 230 of FIG. 2, respectively. The gain control system 520 adjusts the gain of the AGC 220 so that the amplitude of the received signals is substantially matched to the sensitivity of the A/D 230. The bias control system 510 maintains a zero direct current (DC) component at the output of the A/D 230. The gain control system 520 and the bias control system 510 can ensure that clipping-free and DC-free samples are provided to an interference rejecter 240 of FIG. 2 implemented by the systems 300, 600 of FIGS. 3 and/or 6 via reference point A.

In the system of FIG. 5, an AGC 220 sets a gain of the receiver 110 so that the amplitude of a received signal 502 matches a maximum range of an A/D 230 (e.g., 8 bits denoted by [7:0] in the A/Ds) without clipping the received signal 502 using the gain control system 520. In the illustrated example of FIG. 5, the gain control system 520 detects the sudden strength change in the received signal 502. In some examples, changes in the strength of the received signal 502 are caused by the presence and/or absence of an interference signal (e.g., the interference signal J from FIGS. 3 and/or 4, a jamming signal, etc.).

In FIG. 5, the AGC 220 receives an analog input signal 502, represented by I_IN (in-phase signal component) and Q_IN (quadrature signal component). The AGC 220 forwards both components of the signal 502 to be combined with a corresponding bias set by the bias controllers 512, 514 in the bias control system 510. The bias removed signal is quantized by A/D 230 to convert the analog signal 502 to a digital signal 504 (E_IN). In the illustrated example, the output of A/D 230 is equal to the following equation:

$$AD_{out} = \min(\max(-AD_{max}, \text{round}(AD_{in})), AD_{max}).$$

The interference rejecter 240 of the illustrated example uses the gain control system 520 and bias control system 510 to operate at steady state mode. Therefore, if unreliable operation of either the bias control system 510 or the gain control system 520 are detected, the interference rejecter 240 of the illustrated example is reset via reference point B. In some examples, the interference rejecter 240 may be reset by zeroing a delay line and/or weights (e.g., the delay lines 320, 420 and/or the weights 340, 440 of FIGS. 3 and/or 4).

In the illustrated example of FIG. 5, if an interference signal strength increases or clipping occurs, the gain control system 520 detects that an AGC metric 528 corresponding to quantized samples with a maximum amplitude exceeds a threshold 522 (AGC_MAX). In such examples, the gain control system 520 decreases gain of the AGC 220 and the interference rejecter 240 used in association with the system 500 of FIG. 5 are reset because the current estimation of the interference signal may no longer be accurate.

In some examples, if the amplitude of an example interference signal suddenly decreases, the gain control system 520 detects the AGC metric 528 below a minimum threshold 524 (AGC_MIN). In such examples the gain control system 520 increases the gain of the AGC 220, and the processes (e.g., the systems 300, 600 of FIG. 3 or 6) of the interference rejecter 240 used in association with the process 500 of FIG. 5 are restarted because the current estimation of the interference signal is no longer accurate.

In some examples, if the AGC metric 528 is between the minimum threshold 524 and the maximum threshold 522, the AGC 220 is claimed to operate in steady state mode. Under such examples, the AGC metric 528 is compared with a threshold 523 through comparator network 519. The result of the comparison drives the gain control unit 560 to adjust the gain of the AGC 220.

In the illustrated example of the bias control system 510 of FIG. 5, the bias counter 518 generates the bias metric to (1) adjust bias through bias adjuster 512, 514 and (2) monitor the operation mode of the bias control system 510 by comparing the bias metric with a bias threshold 516. A reset of the interference rejecter 240 happens if bias metric from bias counter 518 exceeds the threshold 516.

The in-phase and quadrature components from the A/D 230 forms a sample 504 (E_IN) of FIG. 5, which is forwarded to the interference rejecter 240 via reference point A of the diagram.

The diagram of FIG. 6 presents a diagram depicting the construction of FIGS. 6A-6B. FIGS. 6A-6B depict portions of a system 600 constructed in accordance with the teachings of this disclosure. Accordingly, when referring to FIG. 6 herein, the disclosure refers to the corresponding FIGS. 6A-6B.

The diagram of FIG. 6 is representative of system 600, a realization of the system 300 of FIG. 3 that may implement the interference rejecter 240 of FIG. 2. The system 600 may be communicatively coupled with the system 500 of FIG. 5 via reference points A and B. The diagram of FIG. 6 illustrates an example system 600 for receiving a sample 604 (E_IN), which may be an implementation of the sample 504 (E_IN) of FIG. 5, of a signal including signal (S), jammer or interference (J), and noise (N) components. The system 600 produces a jammer estimate J̃, removes some or all of the interference component J, and outputs a signal component 606 (E_sig).

In an example operation of the system 600 of FIG. 6, sample 604, E_IN=S+J+N, is received from the A/D 230 of FIG. 5 via reference point A. The sample 604 (E_IN) has both an I component (in-phase component) and a Q component (quadrature component). The I component and the Q component of the sample 604 progress through two sets of delay lines 610, 612 and 620, 622, such that the I component progresses through the delay lines 610, 620 and the Q component progresses through the delay lines 612, 622. The sample 604 is buffered in the first delay lines 610, 612 for a threshold number of samples, before being moved to the second delay lines 620, 622. The first delay lines 610, 612 ensure that the samples in the second delay lines 620, 622 are from a different chip than the sample 604. In some examples, the threshold number of samples is denoted as M, where $M=F_S/F_{CHIP}$ and $F_S$ is equal to the sampling frequency and $F_{CHIP}$ is selected as lowest chipping rate or time multiplexing chipping rate, e.g., 0.511 MHz for navigation application The first delay lines 610, 612 enable the process 600 to retain correlation for an interference signal, for example a jamming signal, as described herein, because the jammer signal spans multiple chips and will thus be correlated between chips, even with a delay between samples that makes the samples part of different chips. However, the number of samples M in the delay is larger than a chip, which de-correlates the desired signal component because portions of desired signal components that are combined with different chips are not correlated. Thus, owing to the first delay lines 610, 612, for samples from different chips, only jammer components are correlated.

In the illustrated example, after the sample 604 waits in the first delay lines 610, 612, the sample 604 moves to the second delay lines 620, 622, respectively. A least mean square (LMS) block 630, with an example subsystem 642 to generate a correction for one tap, creates correction weight vector 640 to L taps. The accumulated correction vector results in a weights estimation. For subsystem 642, blocks 680, 682 complete one complex multiplication of Sgn (E_err)*(I[k]+jQ[k]), where (E_err) is an error signal 665, I[k] is an in-phase element from delay line 620 and Q[k] is a quadrature element from delay line 622, which generates one weight correction 684. The integral of signal 684 through kth adder in network 648 represents the current kth weight estimate.

In some examples the delay lines 610, 620, 612, 622, and correction weight vectors 640 are reset once the transient operation mode is observed by the example systems 510, 520 of FIG. 5, as described herein.

The weights in the network 648 complex multiplies with the samples in secondary delay lines 620, 622 to generate an interference estimate 655 (E_LO) using summer 650.

In order to identify and remove the interference component J of the input sample 604, the input sample 604 is combined with an interference estimate 655 (E_LO) (i.e., the interference estimate Ĵ) to yield a sample 665. The combined sample 665 can be defined by E_err=S+N+δJ, where δJ is equal to J−Ĵ. In the illustrated example, the comparator 670, the selectors 672, 694, and zeroing selection logic from a gate 692 (operating similar to the counterparts 370, 372, 394, and 392 described in system 300 of FIG. 3) are used to retain the operation stability of the interference rejecter 240.

In the illustrated example, the removal of the interference component J from input sample 604 is generally independent of the code chip rate of the desired signal component. In the illustrated example, the output signal 606 (E_sig) substantially retains the undistorted chip edge characteristics of the desired signal component. The substantially undistorted chip edge characteristics indicate that the output signal 606 (E_sig) is substantially the same as when the signal was transmitted (e.g., from a satellite transmitter) and is essentially received in the absence of the interference signal component J. The substantially undistorted chip edge characteristics enable the receiver 110 to use advanced multipath mitigation techniques (e.g., Hatch windows, double delta code tracking, etc.).

In the illustrated example of FIG. 6, a counter 690, similar to the example counter 390 of FIG. 3, sets a delay to enable zeroing the sample 665 (E_Err) for the LMS 630 (using the gate 692, the second selector 694, and a downsampler 698) and for the output signal 606 (E_sig) (using the first selector 672).

Example machine readable instructions 700 that may be executed to implement the interference rejecter 240 of FIG. 2 are represented by the flow chart shown in FIG. 7. The instructions begin at block 710, and at block 720, the interference rejecter 240 determines whether a digital signal sample (e.g., the samples 302, 402, 504, 604) including a desired signal component (e.g., the signal S, the signal S+noise N, etc. described with respect to FIGS. 3-6) and an interference signal component (e.g., the interference signal J, a jamming signal, etc.) is received. In some examples, the digital signal sample is received from a satellite of a spread spectrum navigation system. If no sample is received at block 720, control moves to block 760, and the instructions 700 of FIG. 7 end.

If, at block 720, a signal is received, control moves to block 730. At block 730, the interference rejecter 240 generates an interference estimate of the interference signal component based on a group of received samples. In some examples, the received samples were received prior to the sample of block 720. In some examples, the interference estimate is an estimate of the phase and amplitude of the interference signal. In the illustrated example of FIG. 7, the interference rejecter 240 uses an example first delay line (e.g., the delay lines 310, 410, 610, 612) as a buffer. The first delay line stores M samples, where $M=F_S/F_{CHIP}$ and $F_S$ is equal to the sampling frequency and $F_{CHIP}$ may be selected as the lowest chipping rate or time multiplexing chipping rate, e.g., 0.511 MHz for satellite navigation application. The first delay line ensures that there would be no correlation between any desired signal component in samples of a second delay line (e.g., the delay lines 320, 420, 620 and 622) and the desired signal component of the sample of block 720 because M is longer than a chip. The jammer signal spans multiple chips and will thus be correlated between chips, even with a delay between samples that makes the samples part of different chips. However, the number of samples M in the delay is larger than a chip, which de-correlates the desired signal component because portions of desired signal components that are combined with different chips are not correlated. Accordingly, the only correlation between the sample of block 720 and any of the group of samples would be the interference signal component.

At block 730, the interference rejecter 240 moves a sample to a second delay line (e.g., the second delay lines 320, 420, 620, 622) having a length of L, where L is the number of samples in the delay line. As mentioned above, the L samples in the second delay line are from a different chip than the digital signal sample received at block 720. In some examples, the number of samples in the group of samples is equivalent to L. Furthermore, at block 730, the interference rejecter 240 uses a LMS analysis (e.g., the LMS blocks 330, 430, 630 of FIGS. 3, 4, 6) to determine update weights to be applied to the group of samples stored in the second delay line. The LMS analysis is based on one or more of previously outputted, estimated, and/or received samples complex correlated with an error signal.

Furthermore, at block 730, the interference rejecter 240 modulates the weighted samples from the second delay line via a summer (e.g., the summers 350, 450, 650, etc.). The modulation of the group of samples yields the interference estimate (e.g., the interference estimate Ĵ). In some examples, the modulation of the group of weighted samples yields essentially only the interference estimate for at least the reason that the amplitude of the interference signal components are much larger than the signal components or noise components of the samples in the group of samples.

At block 740 of FIG. 7, the interference rejecter 240 combines the interference estimate of block 730 with the sample of block 720 to remove, at least in part, the interference signal component from the sample. In the illustrated example, the combination of the interference estimate and the sample results in the removal, at least in part, of the interference signal component from the sample because the interference estimate is generated in block 730 based on previously received samples. Furthermore, when the previously received samples are modulated, the only correlation among the samples is any interference signal component, for example a jamming signal. Accordingly, the interference estimate is generated to counter the interference signal component of the sample signal of block 720. In the illustrated example, the removal of the interference signal component can be done regardless of a chipping rate of the receiver 110 and/or interference rejecter 240.

After block 740 of FIG. 7, control moves to block 750 and outputs the combination of the interference estimate and the sample. In the illustrated examples disclosed herein, the output signal from block 750 is processed by the receiver 110. After block 750, control returns to block 720 to monitor receipt of the next sample.

Figure 8:
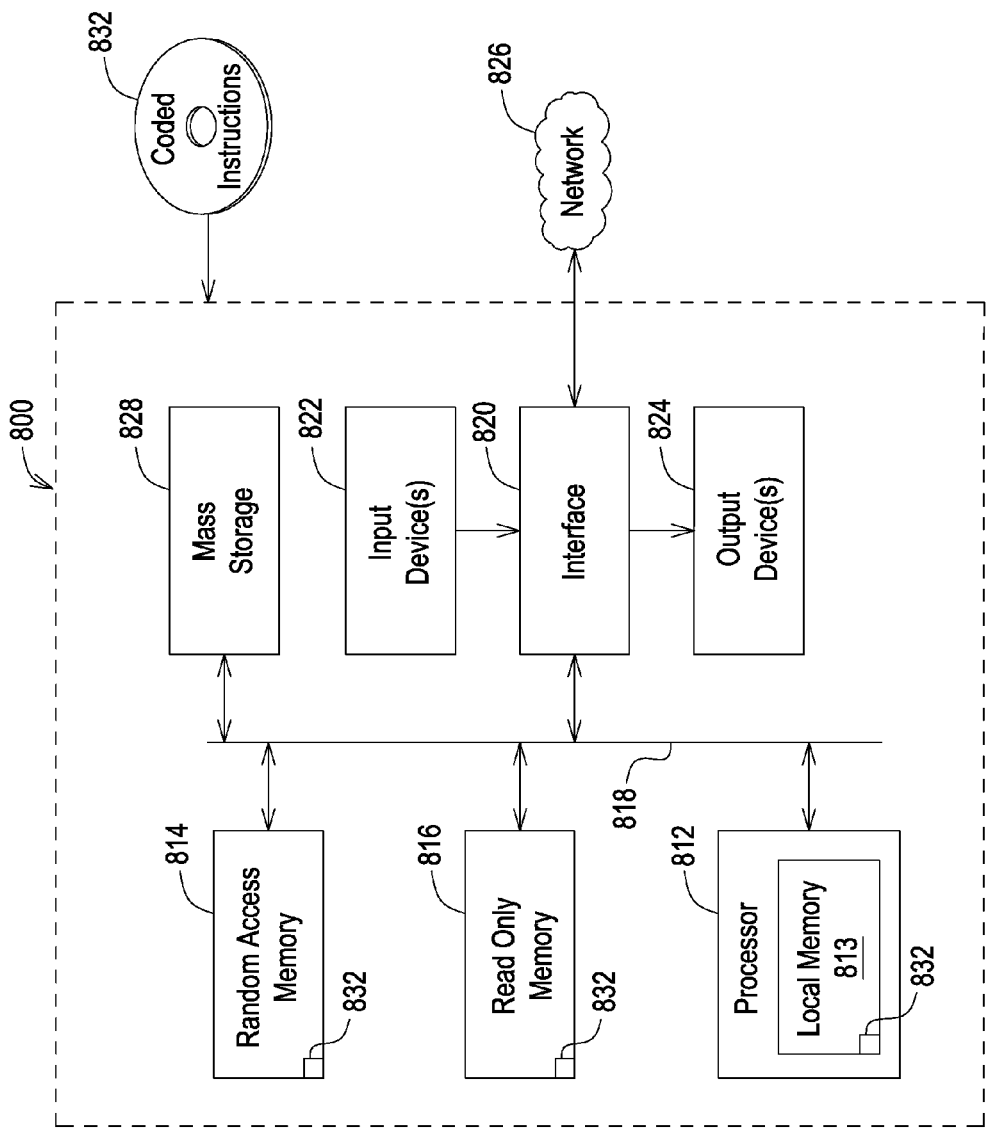
FIG. 8 is a block diagram of an example processor platform that may be used to execute the process of FIG. 7 and other methods to implement the example receiver of FIGS. 1 and/or 2.

FIG. 8 is a block diagram of an example processor platform 800 capable of executing the systems, processes, and/or instructions of FIGS. 3-7 to implement the receiver 110 of FIGS. 1 and/or 2. The processor platform 800 can be, for example, a server, a personal computer, a mobile phone (e.g., a cell phone), a personal digital assistant (PDA), an Internet appliance, or any other type of computing device.

The processor platform 800 of the instant example includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device (s) can be implemented by, for example, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The processor platform 800 also includes one or more mass storage devices 828 for storing software and data. Examples of such mass storage devices 828 include floppy disk drives, hard drive disks, compact disk drives and digital versatile disk (DVD) drives.

The coded instructions 832, which may implement the systems, processes, and/or coded instructions 300, 400, 500, 600, 700 of FIGS. 3-7, may be stored in the mass storage device 828, in the volatile memory 814, in the non-volatile memory 816, and/or on a removable storage medium such as a CD or DVD.

From the foregoing, it will appreciate that the above disclosed methods, apparatus and articles of manufacture provide a method and apparatus for ameliorating signal reception by removing a jamming signal from a received sample by estimating the phase and amplitude of the jamming signal at the time of each input sample using more than one delay line, a weighting system, and a least mean square analysis. The remaining sample retains the original GNSS chip-edge characteristics. Disclosed methods, apparatus, and articles of manufacture provide a method and apparatus for ameliorating signal reception regardless of the GNSS code chipping rate, allowing the receiver to accommodate any of the modernized GNSS signals.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

The following is claimed:

1. A method for ameliorating signal reception of a satellite navigation receiver, the method comprising:
   receiving a composite satellite signal comprising a desired signal component and an interference signal component;
   converting the received composite satellite signal to a digital received composite signal;
   delaying a first group of samples from the digital received composite signal, wherein the first group of samples is delayed based on a ratio of a sampling rate of the composite satellite signal and a chip rate of the desired signal component;
   generating an interference estimate of the interference signal component based on the first group of samples; and
   combining the interference estimate and a second sample belonging to a second group of samples to remove, partially or entirely, the interference signal component from the composite satellite signal, the first group of samples received prior to the sample belonging to the second group of samples, wherein the sampling rate is independent of the chip rate of the desired signal component.

2. The method of claim 1, wherein generating the interference signal estimate comprises generating an interference estimate of an amplitude and phase of the interference signal components and weighted combining of the first group of samples.

3. The method of claim 2, further comprising updating weights used in the weighted combining according to a least mean square process.

4. The method of claim 3, wherein the least mean square process updates the weights by integrating a correlation between the first group of samples and the combined interference signal estimate and the sample belonging to the second group of samples.

5. The method of claim 1, wherein the first group of samples relates to a first communication chip and the sample belonging to the second group of samples relates to a second communication chip different from the first communication chip.

6. The method of claim 5, wherein the second communication chip is at least one communication chip apart from the first communication chip.

7. The method of claim 1, wherein the first group of samples and the second group of samples are associated with a spread spectrum navigation system.

8. An apparatus for ameliorating signal reception of a satellite navigation receiver, the apparatus comprising:
a receiver to receive a composite satellite signal comprising a desired signal component and an interference signal component;
a converter to convert the received composite satellite signal to a digital received composite signal; and
an interference rejecter to delay a first group of samples from the digital received composite signal, wherein the first group of samples is delayed based on a ratio of a sampling rate of the composite satellite signal and a chip rate of the desired signal component, generate an interference estimate of the interference signal component based on the first group of samples, and combine the interference estimate and a second sample belonging to a second group of samples to remove, partially or entirely, the interference signal component from the composite satellite signal, the first group of samples received prior to the sample belonging to the second group of samples, wherein the sampling rate is independent of the chip rate of the desired signal component.

9. The apparatus of claim 8, wherein generating the interference signal estimate comprises generating an interference estimate of an amplitude and phase of the interference signal components and weighted combining of the first group of samples.

10. The apparatus of claim 9, wherein the interference rejecter is further to update weights used in the weighted combining according to a least mean square process.

11. The apparatus of claim 10, wherein the least mean square process updates the weights by integrating a correlation between the first group of samples and the combined interference signal estimate and the sample belonging to the second group of samples.

12. The apparatus of claim 8, wherein the first group of samples relates to a first communication chip and the sample belonging to the second group of samples relates to a second communication chip different from the first communication chip.

13. The apparatus of claim 12, wherein the second communication chip is at least one communication chip apart from the first communication chip.

14. The apparatus of claim 8, wherein the first group of samples and the second group of samples are associated with a spread spectrum navigation system.

15. A tangible computer readable storage medium comprising instructions which when executed cause a machine to at least:
receive a composite satellite signal comprising a desired signal component and an interference signal component;
convert the received composite satellite signal to a digital received composite signal;
delay a first group of samples from the digital received composite, wherein the first group of samples is delayed based on a ratio of a sampling rate of the composite satellite signal and a chip rate of the desired signal component;
generate an interference estimate of the interference signal component based on the first group of samples; and
combine the interference estimate and a second sample belonging to a second group of samples to remove, partially or entirely, the interference signal component from the composite satellite signal, the first group of samples received prior to the sample belonging to the second group of samples, wherein the sampling rate is independent of the chip rate of the desired signal component.

16. The storage medium of claim 15, wherein generating the interference signal estimate comprises weighted combining of the first group of samples.

17. The storage medium of claim 16, wherein the instructions cause the machine to update weights used in the weighted combining according to a least mean square process.

18. The storage medium of claim 17, wherein the least mean square process updates the weights by integrating a correlation between the first group of samples and the combined interference signal estimate and the sample belonging to the second group of samples.

19. The storage medium of claim 15, wherein the first group of samples relates to a first communication chip and the sample belonging to the second group of samples relates to a second communication chip different from the first communication chip.

20. The storage medium of claim 19, wherein the second communication chip is at least one communication chip apart from the first communication chip.

21. The storage medium of claim 15, wherein the first group of samples and the second group of samples are associated with a spread spectrum navigation system.

* * * * *